United States Patent
Basir et al.

(10) Patent No.: US 8,560,179 B2
(45) Date of Patent: *Oct. 15, 2013

(54) ADAPTIVE VISUAL OCCUPANT DETECTION AND CLASSIFICATION SYSTEM

(75) Inventors: Otman Adam Basir, Waterloo (CA); David Bullock, Waterloo (CA); Emil Breza, Beamsville (CA)

(73) Assignee: Intelligent Mechatronic Systems Inc., Waterloo Ontario (CA)

( * ) Notice: Subject to any disclaimer, the term of this patent is extended or adjusted under 35 U.S.C. 154(b) by 2194 days.

This patent is subject to a terminal disclaimer.

(21) Appl. No.: 10/783,390

(22) Filed: Feb. 20, 2004

(65) Prior Publication Data

US 2004/0186642 A1 Sep. 23, 2004

Related U.S. Application Data (60) Provisional application No. 60/448,796, filed on Feb. 20, 2003.

(51) Int. Cl.
*B60N 2/002* (2006.01)
*B60R 21/015* (2006.01)

(52) U.S. Cl.
USPC ................................ 701/45; 382/181; 706/20

(58) Field of Classification Search
CPC ............................. B60N 2/002; B60R 21/015
USPC ........ 701/45, 1; 382/115, 190, 224, 159, 220, 382/104, 154, 181; 348/143; 280/735; 180/271; 345/598, 599, 614, 644, 698; 706/20

See application file for complete search history.

(56) References Cited

U.S. PATENT DOCUMENTS 5,173,949 A * 12/1992 Peregrim et al. .............. 382/294
5,330,226 A 7/1994 Gentry et al.

(Continued)

FOREIGN PATENT DOCUMENTS

| DE | 19947062 A1 | 4/2000 |
|----|-------------|--------|
| EP | 0734909 A2 | 10/1996 |
| EP | 1033290 A2 | 9/2000 |
| EP | 1251465 A2 | 10/2002 |

OTHER PUBLICATIONS

Search Rpt. PCT/CA2004/000238.

(Continued)

*Primary Examiner* — Tuan C. To
(74) *Attorney, Agent, or Firm* — Carlson, Gaskey & Olds P.C.

(57) ABSTRACT

A vision-based vehicle occupant detection and classification system includes a camera mounted in the vehicle interior to capture low resolution images of the seating area. Image processing algorithms account for lighting, motion, and other phenomena. A spatial-feature matrix numerically describes the content of the image. This descriptor is the result of a number of digital filters being run against a set of sub-images, derived from pre-defined window regions in the original image. This spatial-feature matrix is used as an input to an expert classifier function, which classifies this image as best representing a scenario in which the seat is (i) empty, (ii) occupied by an adult, (iii) occupied by a child, (iv) occupied by a rear-facing infant seat (RFIS), (v) occupied by a front-facing infant seat (FFIS), or (vi) occupied by an undetermined object.

7 Claims, 5 Drawing Sheets

(56) References Cited

U.S. PATENT DOCUMENTS

| | | | |
|---|---|---|---|
| 5,528,698 A | 6/1996 | Kamei et al. | |
| 5,842,194 A * | 11/1998 | Arbuckle | 706/52 |
| 5,850,470 A * | 12/1998 | Kung et al. | 382/157 |
| 5,983,147 A | 11/1999 | Krumm | |
| 6,005,958 A | 12/1999 | Farmer et al. | |
| 6,141,432 A | 10/2000 | Breed et al. | |
| 6,198,998 B1 * | 3/2001 | Farmer et al. | 701/45 |
| 6,404,920 B1 | 6/2002 | Hsu | |
| 6,434,254 B1 | 8/2002 | Wixson | |
| 6,480,616 B1 | 11/2002 | Hata et al. | |
| 6,493,620 B2 | 12/2002 | Zhang | |
| 6,507,779 B2 | 1/2003 | Breed et al. | |
| 6,529,809 B1 | 3/2003 | Breed et al. | |
| 6,535,620 B2 | 3/2003 | Wildes et al. | |
| 6,548,804 B1 * | 4/2003 | Yuhara et al. | 250/221 |
| 6,553,296 B2 | 4/2003 | Breed et al. | |
| 6,556,692 B1 | 4/2003 | Gavrila | |
| 6,556,708 B1 * | 4/2003 | Christian et al. | 382/165 |
| 6,563,950 B1 | 5/2003 | Wiskott et al. | |
| 6,647,139 B1 * | 11/2003 | Kunii et al. | 382/159 |
| 6,650,779 B2 * | 11/2003 | Vachtesvanos et al. | 382/228 |
| 6,801,662 B1 * | 10/2004 | Owechko et al. | 382/224 |
| 6,914,526 B2 | 7/2005 | Wallace et al. | |
| 7,050,607 B2 * | 5/2006 | Li et al. | 382/118 |
| 7,197,459 B1 * | 3/2007 | Harinarayan et al. | 704/270.1 |
| 7,308,139 B2 * | 12/2007 | Wentland et al. | 382/181 |
| 7,657,103 B2 * | 2/2010 | Bottou et al. | 382/224 |
| 7,986,820 B2 * | 7/2011 | Moghaddam | 382/124 |
| 2002/0076088 A1 * | 6/2002 | Tsai | 382/118 |
| 2003/0040858 A1 * | 2/2003 | Wallace | 701/45 |
| 2003/0179931 A1 * | 9/2003 | Sun | 382/190 |
| 2003/0223617 A1 * | 12/2003 | Wallace et al. | 382/104 |
| 2004/0176891 A1 * | 9/2004 | Christl et al. | 701/45 |
| 2004/0220705 A1 | 11/2004 | Basir et al. | |
| 2004/0247158 A1 * | 12/2004 | Kohler et al. | 382/104 |
| 2005/0002545 A1 * | 1/2005 | Yasui et al. | 382/104 |

OTHER PUBLICATIONS

Office Action from U.S. Appl. No. 10/801,096, mailed on Jan. 10, 2007.
Amendment from U.S. Appl. No. 10/801,096, filed on Dec. 26, 2006.
Office Action from U.S. Appl. No. 10/801,096, mailed on Sep. 25, 2006.
Amendment from U.S. Appl. No. 10/801,096, filed on Apr. 7, 2006.
Office Action from U.S. Appl. No. 10/801,096, mailed on Oct. 7, 2005.
Preliminary Amendment from U.S. Appl. No. 10/801,096, filed on Jun. 11, 2004.

* cited by examiner

ADAPTIVE VISUAL OCCUPANT DETECTION AND CLASSIFICATION SYSTEM

This application claims priority to Provisional Application U.S. Ser. No. 60/448,796, filed Feb. 20, 2003.

BACKGROUND OF THE INVENTION

This invention relates to the field of image-based vehicle occupant detection and classification. More specifically, the invention uses an imaging system in order to classify a vehicle seat into a number of occupancy classes, the minimum of which includes (i) empty, (ii) occupied by an adult passenger, (iii) occupied by a child passenger, (iv) occupied by a forward facing infant seat, (v) occupied by a rear facing infant seat.

Automobile occupant restraint systems that include an airbag are well known in the art, and exist in nearly all new vehicles being produced. While the introduction of passenger-side airbags proved successful in reducing the severity of injuries suffered in accidents, they have proven to be a safety liability in specific situations. Airbags typically deploy in excess of 200 mph and can cause serious, sometimes fatal, injuries to small or out-of-position occupants. These hazardous situations include the use of rear-facing infant seats (RFIS) in the front seat of a vehicle. While it is agreed upon that the safest location for a RFIS is the back seat, some vehicles do not have a back seat option. While RFIS occupants can be injured from indirect exposure to the force of an airbag, small children and occupants in forward-facing infant seats (FFIS) are at risk of injury from direct exposure to the airbag deployment. Beyond safety concerns, there is also a high financial cost associated with replacing a deployed airbag. Thus, it is preferred to deactivate an airbag when the passenger seat is empty, or occupied by an infant passenger.

Various solutions have been proposed to allow the modification of an airbag's deployment when a child or infant is occupying the front passenger seat. This could result in an airbag being deployed at a reduced speed, in an alternate direction, or not at all. The most basic airbag control systems include the use of a manual activation/deactivation switch controllable by the driver. Due to the nature of this device, proper usage could be cumbersome for the driver, especially on trips involving multiple stops. Weight sensors have also been proposed as a means of classifying occupants, but they may give inconsistent readings while an occupant is moving around in the seat. They may also be fooled by an over-cinched seat belt on an infant seat, and are prone to misclassification of heavy but inanimate objects. Capacitance-based sensors have also been proposed for occupant detection, but they have difficulty dealing with seat dampness.

Vision-based systems offer an alternative to weight-based and capacitance-based occupant detection systems. Intuitively we know that vision-based systems should be capable of detecting and classifying occupants, since humans can easily accomplish this task using visual senses alone. A number of vision-based occupant detection/classification systems have been proposed. In each of these systems one or more cameras are placed within the vehicle interior and capture images of the seat region. The seat region is then observed and the image is classified into one of several pre-defined classes such as "empty," "occupied," or "infant seat." This occupancy classification can then act as an input to the airbag control system. Many of these systems, such as U.S. Pat. No. 5,531,472 to Steffens, rely on a stored visual representation of an empty passenger seat. This background template can then be subtracted from an observed image in order to generate a segmentation of the foreign objects (foreground) in the vehicle. This technique is highly problematic in that it relies on the system having a known image stored of the vehicle interior when empty, and will fail if cosmetic changes are made to the vehicle such as a reupholstery of the seat. As well, unless seat position and angle sensors are used (as suggested by Steffens), the system will not know which position the seat is in and will therefore have difficulty in extracting a segmented foreground image.

Other approaches include the generation of a set of image features which are then compared against a template reference set of image features in order to classify the image. This technique is used in U.S. Pat. No. 5,528,698 to Stevens, and U.S. Pat. No. 5,983,147 to Krumm, in both of which an image is classified as being "empty," "occupied," or having a "RFIS." The reference set represents a training period that includes a variety of images within each occupant classification. However, generation of an exhaustive and complete reference set of image features can be difficult. As well, these systems are largely incapable of interpreting a scenario in which the camera's field-of-view is temporarily, or permanently, occluded. Some occupant detection systems have made use of range images derived from stereo cameras. Systems such as those in U.S. Pat. No. 5,983,147 to Krumm discuss the use of range images for this purpose, but ultimately these systems still face the challenges of generating a complete reference set, dealing with occlusion, and a means for segmenting the foreground objects. Finally, all of these systems that rely on a training set require that the classifier function be retrained if the camera mount location is moved, or used in a different vehicle.

SUMMARY OF THE INVENTION

This invention is a vision-based device for use as a vehicle occupant detection and classification system. A camera mounted in the vehicle interior captures low resolution images of the seating area. Image processing algorithms can be applied to the image to account for lighting, motion, and other phenomena. A spatial-feature matrix is then generated which numerically describes the content of the image. This descriptor is the result of a number of digital filters being run against a set of sub-images, derived from pre-defined window regions in the original image. This spatial-feature matrix is then used as an input to an expert classifier function, which classifies this image as best representing a scenario in which the seat is (i) empty, (ii) occupied by an adult, (iii) occupied by a child, (iv) occupied by a rear-facing infant seat (RFIS), (v) occupied by a front-facing infant seat (FFIS), or (vi) occupied by an undetermined object. This expert classifier function is trained using an extensive sample set of images representative of each occupancy classification. Even if this classifier function has not encountered a similar scene through the course of its training period, it will classify the captured image based on which occupancy class generated the most similar filter response.

This occupancy classification from the captured image is then smoothed with occupancy classifications from the recent past to determine a best-estimate occupancy state for the seating area. This occupancy state is then used as the input to an airbag controller rules function, which gives the airbag system deployment parameters, based on the seat occupancy determined by the system.

This invention makes no assumptions of a known background model and makes no assumptions regarding the posture or orientation of an occupant. The device is considered to be adaptive as once the expert classifier function is trained on one vehicle, the system can be used in any other vehicle by taking vehicle measurements and adjusting the system parameters of the device. The system may be used in conjunction with additional occupant sensors (e.g. weight, capacitance) and can determine when the visual input is not reliable due to camera occlusion. In the absence of additional non-visual sensors, the device can sense when it is occluded or unable to generate usable imagery. In such a situation, the airbag will default to a pre-defined "safe state."

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
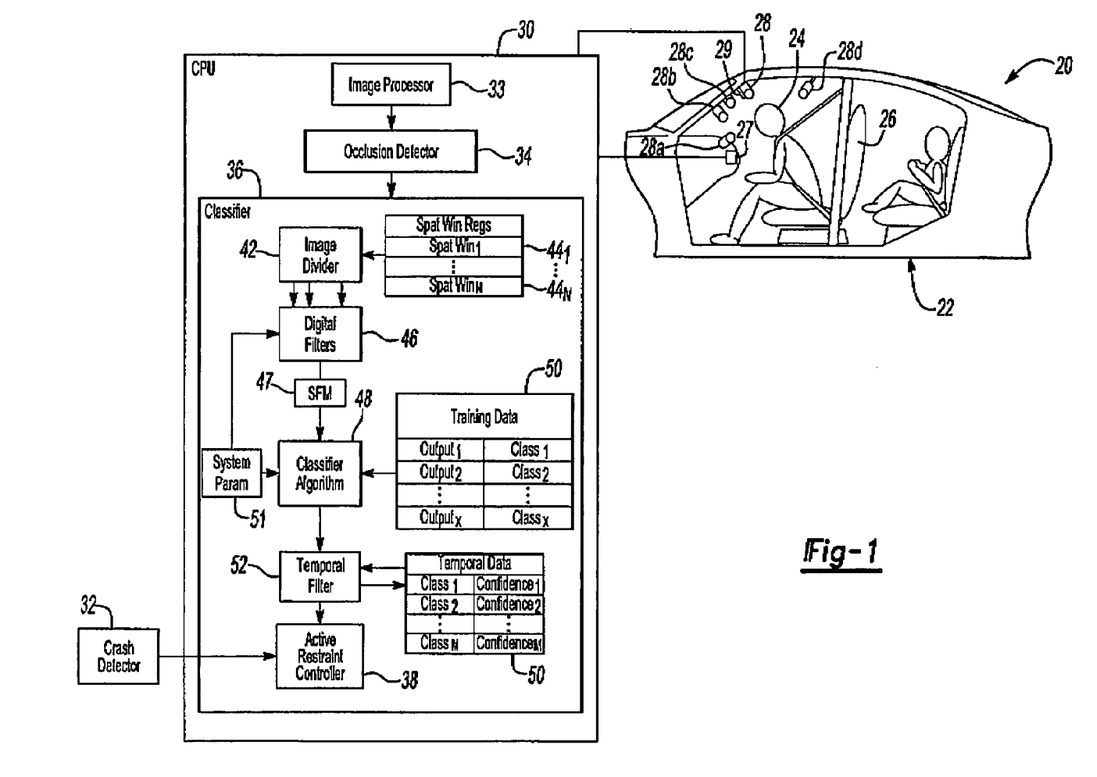
FIG. 1 schematically shows an occupant classification system according to the present invention.

An occupant classification system 20 is shown schematically in FIG. 1 installed in a vehicle 22 for classification of an occupant 24 in an occupant area 26 (in this example, a seat 26). The classification of the occupant 24 may be used, for example, for determining whether or how to activate an active restraint 27 (such as an air bag) in the event of a crash. The occupant classification system 20 includes a camera 28 and a computer 30 having a processor, memory, storage, etc. The computer 30 is appropriately programmed to perform the functions described herein and may also include additional hardware that is not shown, but would be well within the skill of those in the art.

The camera 28 is directed toward the occupant area 26. The camera 28 may include a lens, lens filters, an image sensor, a lens mount, image sensor control circuitry, a mechanical enclosure, and a method for affixing the camera 26 to the vehicle interior. The camera 28 may also include a digital encoder, depending on the nature of the image sensor. The camera 28 may also include a light source 29, such as an LED.

The camera 28 may be mounted in a number of locations within the interior of the vehicle 22, such as in the headliner at the windshield transition, as shown. Alternate locations for the camera 28 are shown as camera 28a (on the dashboard), camera 28b (on the windshield frame), camera 28c (behind the rearview mirror), and camera 28d (above the seat 26 in the headliner). Preferably, the camera 28 is located so that the region including the occupant area 26 is within the field-of-view, regardless of the seat angle or slider position.

Again, in the preferred embodiment the camera 28 is placed in the vehicle headliner at the headliner/windshield transition. This viewpoint provides a clear and usually unobstructed view of the occupant area 26. Additionally, the view from this position should be relatively consistent in similarly sized vehicles. This will allow the system to perform occupancy detection/classification duties in a variety of vehicles using the same training data and expert classifier function.

The computer 30 is suitably programmed to include an image processor 33, occlusion detector 34, occupant classifier 36 and active restraint controller 38. The classifier 36 further includes a spatial image divider 42 for dividing the image into N subimages based upon spatial windows defined by spatial window registers $44_{1-N}$. The subimages from the image divider 42 are each sent to a plurality of digital filters 46. In the preferred embodiment, the digital filters 46 may take the form of FIR (finite impulse response) filters, which can be tuned to extract quantitative image descriptors such as texture, contours, or frequency-domain content. The digital filters 46 may produce scalar values, histograms, or gradients. In all cases, these filter outputs are grouped together sequentially to produce a single spatial-feature matrix 47 which is sent to the expert classifier algorithm 48

The outputs of the digital filters 46 are all low-level image descriptors; that is, they quantitatively describe the low-level features of an image which include, but are not limited to, edge information, contour information, texture information, contrast information, brightness information, etc. In our preferred embodiment these descriptors model a number of regional attributes in a subimage such as: how complex the texture patterns are in a region, how natural the contours appear to be, how strongly the edges contrast with each other, etc. The answers to these questions classify the occupant 24, as opposed to a high-level approach which relies on questions such as: where is the occupant's head, how far apart are the occupants eyes, etc. By combining these low-level descriptors into a spatially context-sensitive format (the spatial feature matrix 47) the image content is described robustly with a small number of parameters.

Two types of filters 46 are used in the current system: FIR filters (finite impulse response filters) and Algorithmic Filters. FIR filters essentially apply a convolution operator to each pixel in order to generate a numerical value for every pixel which is evaluated. The algorithmic filter uses an algorithm (such as a contour following algorithm which may measure the length of the contour to which the examined pixel is attached) to generate a numerical value for every pixel which is evaluated.

These digital filter outputs may be represented in a number of ways, some of which produce a single value for a subwindow (such as counting the number of edge pixels in a subimage, or counting the number of edges which point upwards) while some produce a group of numbers (such as representing filter outputs via histograms or gradients).

Either way, in all cases, the digital filter 46 outputs are represented in some way (scalar values, histograms, gradients, etc.) and then placed together end-to-end to form the spatial-feature matrix 47. The spatial-feature matrix 47 is the input data for the neural network, while the output vector is the classification likelihoods for each of the classification levels (empty, rfis, ffis, child, adult, etc.)

The expert classifier algorithm 48 accesses stored training data 50, which comprises known sets of filtered outputs for known classifications. The output of the classifier algorithm 48 is received by temporal filter 52 and stored in the temporal filter data set 50, which includes the previous M output classifications 56 and an associated confidence rating 58 for each.

The overall operation of the occupant classification system 20 of FIG. 1 will be described with respect to the flow chart of FIG. 2. At the time of vehicle ignition in step 80, the device performs a system diagnostic in step 82. This includes a formal verification of the functionality of all system components. The camera 28 captures an image of the occupant area 26 in step 84. The image is processed by the image processor 33 in step 86. Situations such as night time driving and underground tunnels will result in low-light levels, making image capture problematic. The system 20 compensates for low-light level image capture through a combination of image processing algorithms, external light source 29, and use of ultra-sensitive image sensors. After image capture and encoding, a number of image processing filters and algorithms may be applied to the digital image in step 86 by the image processor 33. This image processing can accommodate for low light levels, bright lighting, shadows, motion blur, camera vibration, lens distortion, and other phenomena. The output from the image processor 33 is an altered digital image.

Despite placement of the camera 28 in the vehicle headliner, or other high-vantage positions, situations may arise in which the camera's view of the occupant area 26 is occluded. Such scenarios include vehicles with an excessive amount of cargo, occupant postures in which a hand or arm occludes the camera's entire field-of-view, or vehicle owners who have attempted to disable the camera device by affixing an opaque cover in front of the lens. In such situations it is desirable to have the occlusion detector 34 determine whether there is occlusion in step 88. In the presence of occlusion, the system 20 reverts to a default "safe state" in step 96. The safe state may be defined to be "empty" such that the active restraint is never activated, or such that the active restraint is activated with reduced force.

Once an image has been processed, and determined to contain usable data, it is classified into one of the pre-defined occupancy classes by the classifier 36. In the preferred embodiment, these classes include at least these classes: (i) empty, (ii) adult occupant, (iii) child occupant, (iv) rear-facing infant seat [RFIS], (v) front-facing infant seat [FFIS]. Additional occupancy classes may exist, such as differentiation between large adults and small adults, and recognition of small inanimate objects, such as books or boxes.

Figure 2:
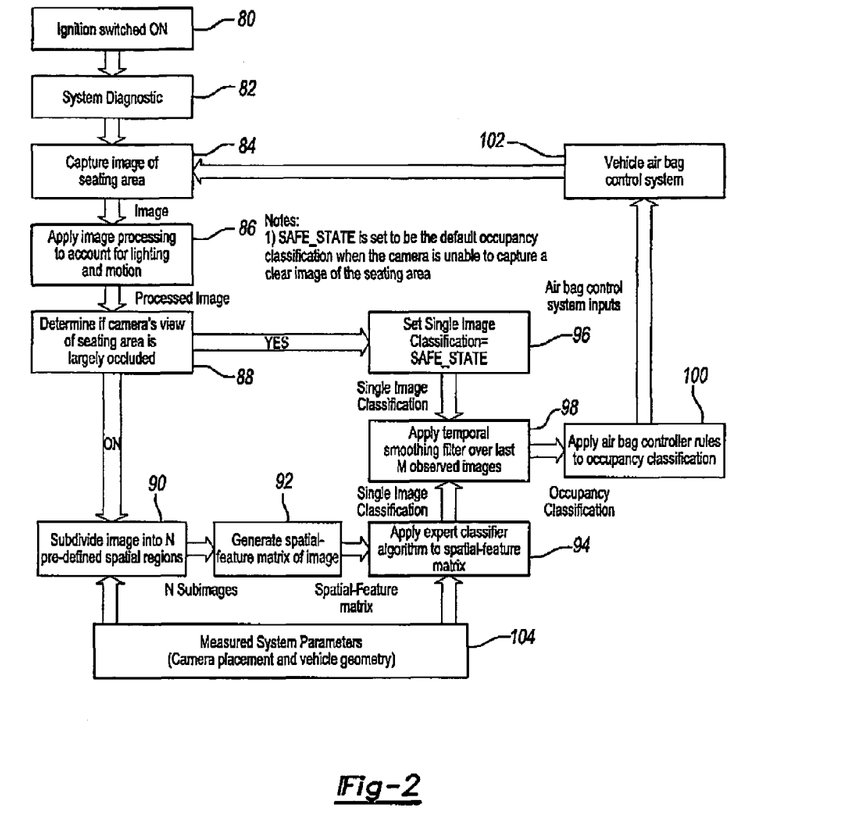
FIG. 2 is a high-level system flowchart, showing the operation of the occupant classification system of FIG. 1.
Figure 3:
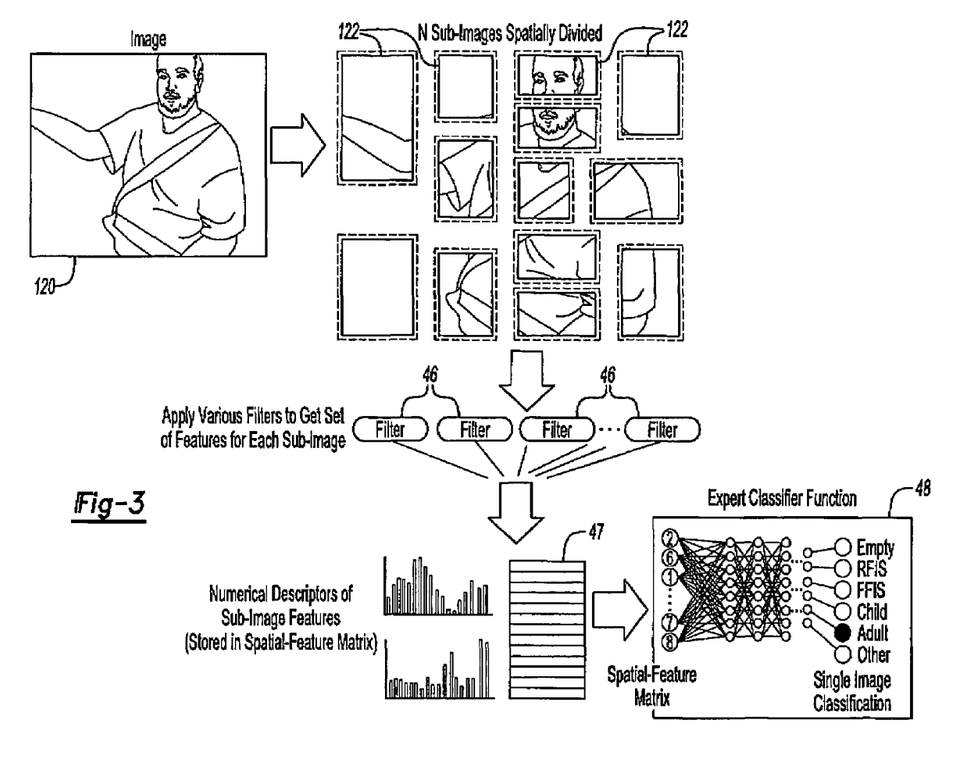
FIG. 3 is a flowchart of the classification algorithm.

FIG. 3 conceptually shows the image classification method performed by the classifier 36. Referring to FIGS. 1-3, in step 90 the image divider 42 divides the input image 120 into several sub-images 122 as defined by spatial window registers 44$_{1-N}$. The placement and dimensions of these spatial windows is a function of the geometry of the vehicle interior. Some of the spatial windows overlap with one another, but the spatial windows do not necessarily cover the entire image 120. Once the expert classifier function is trained (as described more below), the camera 28 may be moved, repositioned, or placed in a different vehicle. The system 20 compensates for the change in vehicle geometry and perspective by altering the spatial windows as defined in spatial window registers 44.

In step 92, the digital filters 46 are then applied to each of these sub-images 122. These digital filters 46 generate numerical descriptors of various image features and attributes, such as edge and texture information. The response of these filters 46 may also be altered by the vehicle geometry parameters 51 in order to compensate for the spatial windows possibly being different in size than the spatial windows used during training. Grouped together, the output of the digital filters are stored in vector form and referred to as a spatial-feature matrix 47. This is due to the matrix's ability to describe both the spatial and image feature content of the image. This spatial-feature matrix 47 is used as the input to the expert classifier algorithm 48.

In step 94, the output of the expert classifier algorithm 48 is a single image occupancy classification (empty, adult, child, RFIS, FFIS, etc.). The expert classifier algorithm 48 may be any form of classifier function which exploits training data 50 and computational intelligence algorithms, such as an artificial neural network.

Training of the expert classifier function is done by supplying the function with a large set of training data 50 which represents a spectrum of seat scenarios. Preferably this will include several hundred images. With each image, a ground-truth is supplied to indicate to the function what occupancy classification this image should generate. While a large training set is required for good system performance, the use of spatially focused digital features to describe image content allows the classifier algorithm 48 to estimate which training sub-set the captured image is most similar to, even if it has not previously observed an image which is exactly the same.

To ensure that the knowledge learned by the expert classifier algorithm 48 in training is usable in any vehicle interior, the expert classifier algorithm 48 may be adjusted using system parameters 51 which represent the physical layout of the system. Once a mounting location for the camera 28 has been determined in a vehicle 22, physical measurements are taken which represent the perspective the camera 28 has of the occupant area 26, and the size of various objects in the vehicle interior. These physical measurements may be made manually, using CAD software, using algorithms which identify specific features in the image of the occupant area 26, or by any other means. These physical measurements are then converted into system parameters 51 which are an input to the expert classifier algorithm 48 and image divider 42. These parameters 51 are used to adjust for varying vehicle interiors and camera 28 placements by adjusting the size and placement of spatial windows as indicated in the spatial window registers 50, and through alteration of the digital filters 46. Altering the digital filters 46 is required to individually scale and transform the filter response of each sub-image. This allows the spatial-feature matrix 47 that is generated to be completely independent of camera 28 placement and angle. Consequently, the system 20 is able to calculate occupancy classifications from any camera 28 placement, in any vehicle 22.

In an alternative method, a known pattern may be placed on the occupant area 26. While in a calibration mode, the camera 28 then captures an image of the occupant area 26 with the known pattern. By analyzing the known pattern on the occupant area 26, the system 20 can deduce the system parameters 51 necessary to adapt to a new vehicle 22 and/or a new location/orientation within the vehicle 22.

The expert classifier algorithm 48 generates a single image classification based upon the analysis of a single image, the training data 50 and the system parameters 51. Transitions between occupancy classes will not be instantaneous, but rather they will be infrequent and gradual. To incorporate this knowledge, the single image classifications are temporally smoothed over the recent past by the temporal filter 52 in step 98 to produce a final seat occupancy classification.

Figure 4:
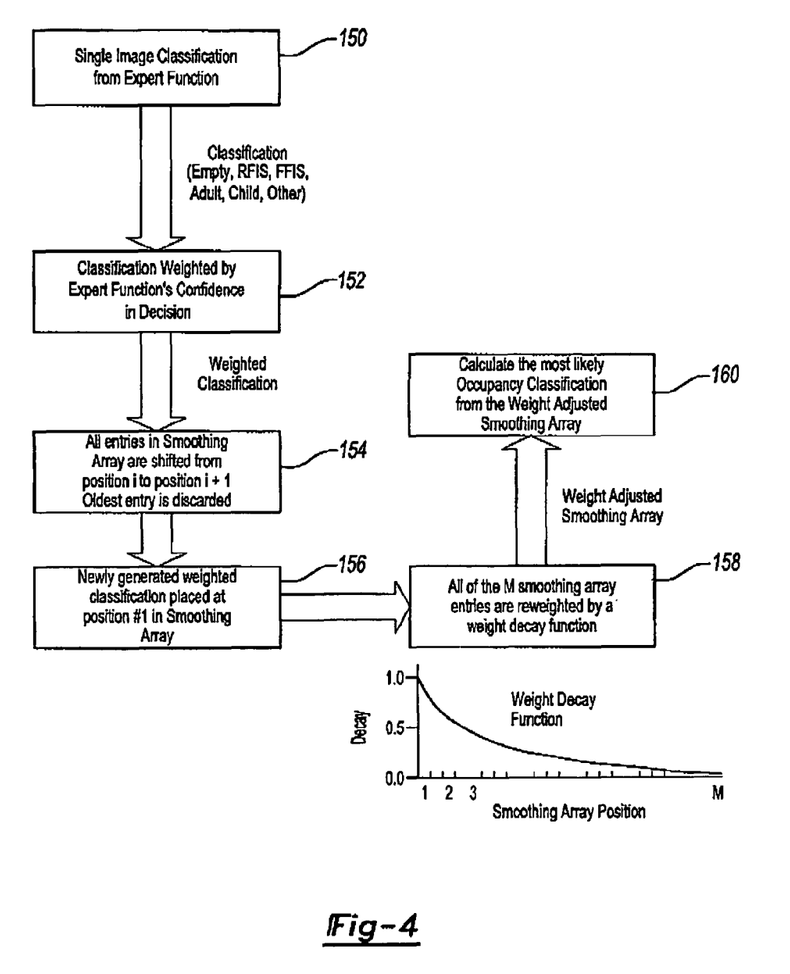
FIG. 4 is a flowchart of the temporal smoothing function.

This temporal smoothing in step 98 of FIG. 2 occurs as shown in the flow chart of FIG. 4. The temporal filter 52 (FIG. 1) keeps a record of the past M single image classifications in a memory and receives the single image classification in step 150, which is weighted by the classifier algorithm's confidence level in that classification in step 152. Each classification record is weighted according to the classification confidence level calculated by the expert classifier algorithm 48. All the entries in the array are shifted one position, and the oldest entry is discarded in step 154. In step 156, the present weighted classification is placed at the first position in the array. All of the M image classifications are reweighted by a weight decay function, which weighs more recent classifications more heavily than older classifications in step 158. Older image classifications are made to influence the final outcome less than more recent image classifications. In step 160, the smoothed seat occupancy classification is then generated by summing the past M image classifications, with preferential weighting given to the most recently analyzed images. This temporal smoothing will produce a more robust final classification in comparison to the single image classification. As well, smoothing the classification output will avoid momentary spikes/changes in the image classification due to short-lived phenomena such as temporary lighting changes and shadows.

Referring to FIGS. 1 and 2, once the seat occupancy classification has been determined in step 98, the active restraint controller 38 determines the corresponding active restraint deployment settings. This algorithm associates the detected seat occupancy class with an air bag deployment setting, such as, but not limited to, "air bag enabled," "air bag disabled," or "air bag enabled at 50% strength." Once the deployment settings are determined, these controller inputs are sent to the vehicle's air bag controller module which facilitates air bag deployment in the event of a crash, as determined by crash detector 32.

Figure 5:
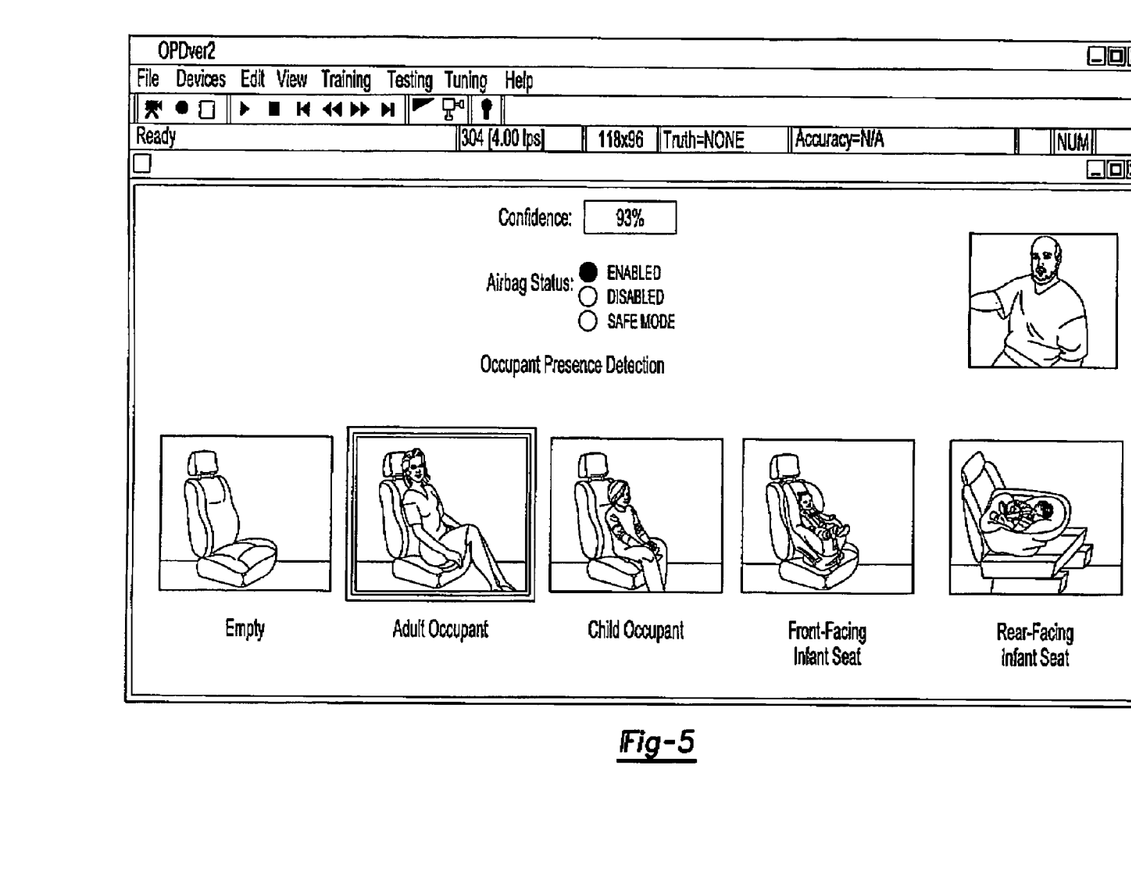
FIG. 5 is a screen capture of the visual occupant detection system running on a personal computer.

FIG. 5 illustrates a screen of a personal computer used to calibrate and/or test the occupant classification system 20 of FIGS. 1-4.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, some of the features implemented in software may alternatively be provided in hardware. Although many functions are described as being provided by the same computer 30, more than one computer 30 (or more than one processor) could be used to implement these features. Alphanumeric identifiers for steps in the method claims are for ease of reference by dependent claims, and do not indicate a required sequence, unless otherwise indicated.

What is claimed is:

1. A method for classifying an occupant including the steps of:
    a) capturing an image of an occupant area in a vehicle;
    b) dividing the image into a plurality of subimages of predetermined spatial regions;
    c) generating a plurality of low-level descriptors from each of the plurality of subimages;
    d) analyzing the low-level descriptors; and
    e) classifying an occupant in the occupant area based upon step d) into one of a plurality of classifications, wherein the classifications include: infant seat.

2. The method of claim 1 wherein said step d) further includes the step of analyzing the low-level descriptors based upon a set of training data.

3. The method of claim 2 further including the step of creating the set of training data by capturing a plurality of images of known occupant classifications of the occupant area.

4. The method of claim 1 wherein said steps d) and e) are performed using a neural network.

5. The method of claim 1 wherein said step d) is based upon system parameters including an orientation or a location from which the image is captured relative to the occupant area.

6. The method of claim 5 further including the step of:
    f) altering the orientation or the location from which the image is captured and adjusting the system parameters.

7. The method of claim 6 wherein said step f) further includes the step of entering physical data representing a physical orientation and location of the occupant area.

* * * * *